May 17, 1938. T. F. BRANDT 2,117,697
POTHEAD
Filed Jan. 30, 1936 2 Sheets-Sheet 1

Inventor
Thomas F. Brandt
By Alpheus J. Crane
Attorney

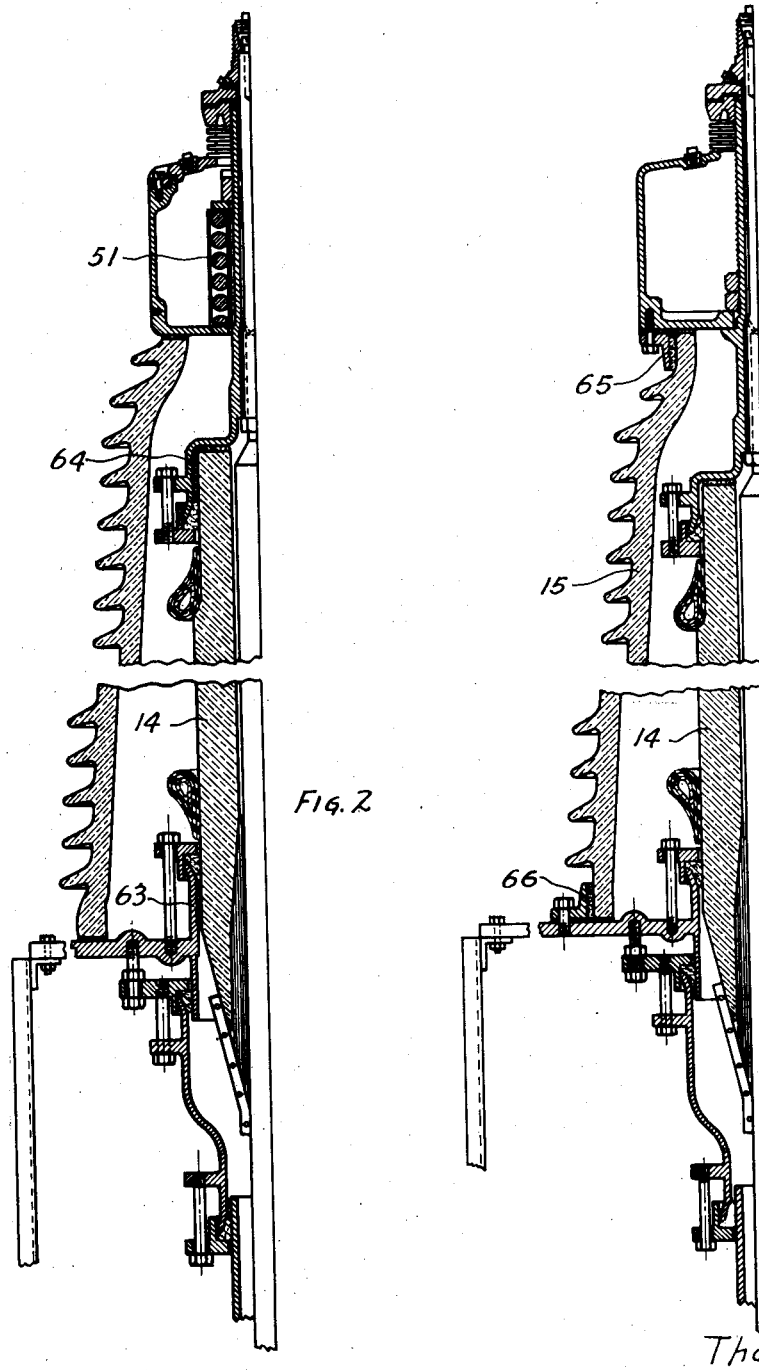

Patented May 17, 1938

2,117,697

UNITED STATES PATENT OFFICE 2,117,697

POTHEAD

Thomas F. Brandt, Barberton, Ohio, assignor to The Ohio Brass Company, Mansfield, Ohio, a corporation of New Jersey Application January 30, 1936, Serial No. 61,527

16 Claims. (Cl. 247—6)

This invention relates to potheads or outlet terminals for high potential electric cables immersed in oil under pressure.

One object of the invention is to provide a terminal pothead for a high potential electric cable which will provide an effective insulation between the cable and its grounded support and withstand a high oil pressure surrounding the cable, and which can be practically completely assembled at the factory and easily installed on the job.

A further object of the invention is to provide a pothead having a porcelain sleeve for providing the principal insulation, the sleeve being connected by packing glands to the cable housing to insure against leakage of oil.

A further object of the invention is to provide a pothead having a pair of dielectric sleeves forming internal and external oil chambers and packing glands for closing the connection between the internal sleeve and the other portions of the high pressure oil chamber.

A further object of the invention is to provide an oil tight pothead for a high pressure cable which shall be economical to manufacture and easy to install.

A further object of the present invention is to provide a device of the class named which shall be of improved construction and operation.

Other objects and advantages will appear from the following description.

The invention is exemplified by the combination and arrangement of parts shown in the accompanying drawings and described in the following specification, and it is more particularly pointed out in the appended claims.

In the drawings:

Figs. 2 and 3 are fragmentary sections of modified forms of the invention.

In the operation of high potential electric cables, it has been found advantageous to surround the cable with a metal conduit which will withstand a relatively high pressure and to fill the conduit with an insulating liquid, such as oil under pressure, the pressure ranging from 180 to 250 pounds per square inch. This outer conduit is at ground potential and it is therefore necessary, of course, that the conductor and its terminal be insulated from the conduit and the grounded support for the outlet housing. It is also necessary to guard against concentration of electrostatic flux at the termination of the grounded covering for the cable. The means for effecting this insulation must also prevent escape from the conduit of the oil under pressure and be sufficiently economical to manufacture and easy to install to constitute a practical device.

Figure 4:
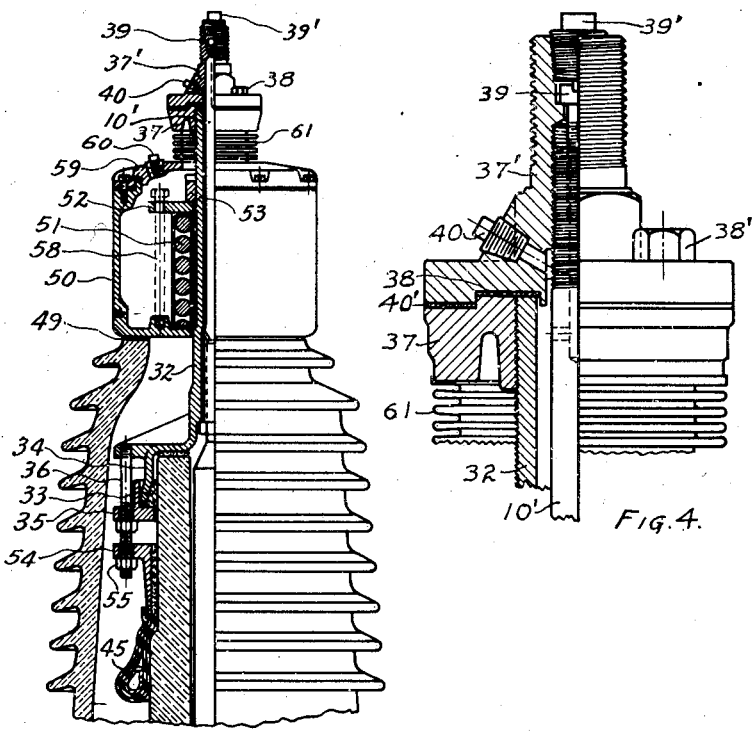
Fig. 4 is a fragmentary elevation, partly in section, of the pothead terminal but on a larger scale than Fig. 1.
Figure 1:
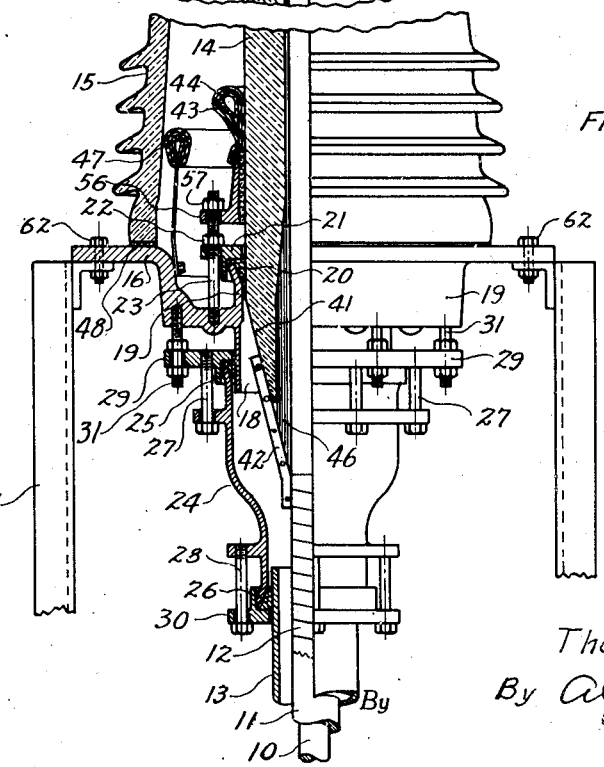
Fig. 1 is an elevation with parts in section showing one embodiment of the present invention.

One form of the present invention for securing these results is shown in Fig. 1 in which the numeral 10 designates a high potential conductor wrapped with insulation 11, usually of paper, the insulation having a strip of thin, perforated metal 12 wrapped around its outer surface. A metal pipe or conduit 13, filled with oil under pressure, surrounds the cable.

The terminal pothead for the cable comprises an inner porcelain tube 14 and an outer porcelain tube or cone 15. The tubes 14 and 15 are supported on a base flange 16 carried on a suitable frame 17. The flange 16 is provided with a central opening for receiving the tube 14, the opening being surrounded by a downwardly extending rim 18 and an upwardly extending rim 19, the two forming a collar surrounding the tube 14 where it passes through the flange 16. The upper edge of the rim 19 is flared outwardly to provide a pocket for packing material 20, the packing being compressed in the gland thus formed by a ring 21 which is forced downwardly upon the packing by nuts 22 on stud bolts 23 having their lower ends threaded into blind openings in the flange 16. A collar 24 bridges the space between the lower end of the rim 18 and the upper end of the conduit 13, packing glands 25 and 26 being provided to form oil tight joints at the opposite ends of the collar 24. Bolts 27 and 28 are used for tightening the packing glands, the glands being provided with rings 29 and 30 respectively. The upper ring 29 is secured to the flange 16 by a series of screws 31. It will be seen that the collar 24 and sleeve formed by the rims 18 and 19 form a tight connection between the end of the conduit 13 and the lower end of the dielectric tube 14 so that the high pressure in the conduit may be continued to the interior of the tube without escape.

The packing glands are all formed by cooperative members which are connected by screws directly connecting the two members which bear upon the packing so that the glands are self-contained and the stress for compressing the packing is not transmitted to the connected parts.

A terminal sleeve 32 is mounted on the upper end of the tube 14 and is provided with a liquid tight connection by means of a packing gland 33.

The gland 33 comprises a flange 34 on the lower end of the sleeve 32 and a ring 35 cooperating with the flange to compress the packing. Bolts 36 connect the flange and ring. The upper end of the sleeve 32 is threaded into a ring nut 37, the threads being coated with solder and sweated together to make the joint liquid tight. The conductor 10 is provided with an extension 10' which is drawn through the sleeve 32 and held in place by a terminal cap 37' threaded onto the upper end of the extension. Packing 38 is interposed between the parts 37 and 37' to insure a tight joint at this point and the parts are pressed together on the packing by cap screws 38'. A screw 39 is threaded into the upper end of the extension 10' and bears on a shoulder on the terminal cap 37' to insure good electrical connection between the engaging threads on these members. A pipe plug 39' closes the end of the terminal member 37' after the conductor has been secured in place to prevent escape of the high pressure oil within the pothead. A vent is provided at the upper end of the sleeve 32 closed by a pipe plug 40. The vent is to permit the escape of air when the pothead is filled with oil under pressure from the conduit 13. The outer portions of the adjacent surfaces of the parts 37 and 37' are slightly offset relative to the inner portions and a weathering gasket 40' is inserted between these offset portions to protect the packing 38 from deterioration.

It will be seen that the parts thus far described provide an insulating continuation of the conduit about the cable in the form of the porcelain tube 14 and that the terminal for the conductor is insulated from the grounded portions of the conduit and its support by means of this porcelain tube. With the arrangement shown, it is not necessary to rely upon cemented joints to withstand the high pressure within the conduit but all the joints are packed joints with bolts for tightening the packing.

In order to control the electrostatic flux at the termination of the metal conduit surrounding the cable and at the lower end of the conductor terminal, means are provided for gradually taking up the stress at these points and for preventing concentration at any particular zone. The lower end of the tube 14 is tapered, as shown at 41, and a split cone of sheet metal 42 bridges the space between the termination of the metal wrapping 12 and the tapered portion 41 of the porcelain tube. The wrapping 12 is of course grounded on the conduit 13. The outer surface of the tube 14 is covered with a coating of metal which continues from the lower end of the tube up to a flux control 43 surrounding the tube 14 above the flange 16. The flux control 43 is surrounded by an insulated wrapping 44 to avoid any danger of corona or discharge at this point. A similar flux control 45 is connected to the terminal sleeve 32 by a metallized coating on the outer surface of the upper end of the tube 14 and counteracting any tendency for discharge from the lower end of the upper terminal. The lower end of the tube 14 is slightly counterbored and the cable insulation at this point is reinforced by a supplemental wrapping 46 of paper or varnished cambric or other suitable sheet dielectric material. The flange 16 may also be provided with an insulated flux control 47.

The space between the porcelain members 14 and 15 is preferably filled with an insulating oil but this oil is not under the high pressure of the oil in the conduit 13 but is simply under the static pressure due to its head. To prevent escape of the oil within the cone 15, a gasket 48 is interposed between the lower end of the cone and the flange 16 and a gasket 49 is placed between the upper end of the cone and the expansion chamber 50 for the oil in the cone. These gaskets are held under compression by means of a spring 51 which surrounds the terminal sleeve 32 and presses downwardly upon the bottom of the expansion chamber 50. The upward thrust of the spring 51 is received by a flange 52 which bears against a ring nut 53 threaded onto the sleeve 32. This of course transmits the upper thrust of the spring to the sleeve 32 and in order to withstand this thrust, a flange 54 is cemented to the tube 14 and is connected to the sleeve 32 by nuts 55 on the lower ends of the bolts 36, the upper ends of the bolts 36 being fixed to the flange 34. A second flange 56 is cemented to the lower end of the tube and connected by the bolts 23 and nuts 57 to the flange 16. It will thus be seen that the inner tube 14 is placed under sufficient tension by the spring 51 to provide the pressure for maintaining tight joints at the upper and lower ends of the cone 15. The spring 51 may be held in compression during assembly by bolts 58 which are removed after the parts are in place. The cover 59 for the expansion chamber 50 is placed in position after the bolts 58 are removed and the oil for the space between the porcelain members 14 and 15 is supplied through an opening in the cover, which is then closed by means of a pipe plug 60. In order to provide a tight connection between the expansion chamber 50 and the terminal 37, an accordion bellows 61 has its lower end soldered to the cover 59 and its upper end soldered to the terminal 37. This will permit relative movement between the terminal 37 and the expansion chamber 50 without placing the connected parts under stress.

In the installation of the pothead, the base flange 16 and the parts mounted thereon are all assembled in the factory and when taken to the job are simply mounted on the stand 17 and secured in place by bolts 62. The sleeve 24 is disconnected from the flange 16 and placed loosely over the end of the conduit 13 and the cable is drawn upwardly through the bushing and secured in the terminal 37' which in turn is clamped to the ring nut 37 by means of a screw 38', the wrapping 46 being first placed in position at the proper point in the cable. The split cone 42 is then secured about the cable to bridge the space between the wrapping 12 and the tapered portion 41 of the tube 14. The sleeve 24 is then slid up and secured in position by the bolts 31 and the packing glands 25 and 26 are tightened by their respective bolts. The oil may then be admitted to the conduit 43 and when it appears at the upper end of the terminal 37, the pipe plug 39 is screwed into place to close the interior chamber. The oil may be placed in the outer chamber before the bushing is shipped or the outer chamber may be filled after it is in position if desired.

The form of the invention shown in Fig. 2 is similar to that shown in Fig. 1 except that the flanges 54 and 56 of Fig. 1 are omitted in Fig. 2 and in their stead the flanges 63 and 64 are cemented directly to the tube 14 for transmitting the tension of the spring 51.

In the form of the invention shown in Fig. 3, the spring 51 is omitted and flanges 65 and 66 are cemented directly to the ends of the cone 15 to provide joints at the upper and lower ends of the cone respectively. In this case there is no stress produced by spring action and it is unnecessary to cement any of the parts to the inner tube 14 to withstand such tension.

I claim:

1. The combination with a conductor having an insulating covering and a conduit surrounding said conductor and covering and filled with insulating fluid under pressure, of an insulating housing for said conductor comprising an insulator tube surrounding a portion of said conductor projecting from said conduit, a fitting connected with said conduit, an attachment member fixed to said tube and mechanically connected to said fitting for transmitting mechanical stress between said tube and fitting, a collar on said fitting surrounding said tube, packing for sealing the joint between said collar and tube, a ring surrounding said tube adjacent said collar, said ring being movable relative to said tube, and means connecting said ring and fitting for compressing said packing.

2. The combination with a conductor having an insulating covering and a conduit filled with insulating fluid under pressure surrounding said conductor and covering, of an insulating housing for said conductor comprising a porcelain tube surrounding the end of said conductor projecting from said conduit, a sleeve bridging the space between the end of said conduit and said tube, an adjustable packing gland connecting said sleeve with said tube and comprising a pair of gland elements, packing interposed between one of said elements and said tube, the other of said elements being movable relative to said tube to compress said packing, and means for relatively adjusting said elements.

3. The combination with a conductor and a conduit filled with insulating liquid under pressure surrounding said conductor, of an insulating tube enclosing said conductor at the end of said conduit, and means for connecting said conduit with said tube, said connecting means comprising a mechanical joint and a packing gland having packing material therein for forming a liquid tight joint with said tube and having means for compressing said packing material without transmitting stress to said mechanical joint.

4. An electrical insulator comprising a fitting having an opening therethrough, a dielectric tube registering with said opening and having a portion provided with an outer cylindrical surface, means for mechanically connecting said fitting and tube to transmit mechanical stresses therebetween, and a liquid tight joint between said fitting and tube in addition to said mechanical connection, said liquid tight joint comprising packing material bearing on the cylindrical portion of the outer surface of said tube and means for compressing said packing material against said surface without transmitting stress to said tube except through said packing material.

5. An electrical insulator comprising a fitting having an opening therethrough, a dielectric tube registering with said opening, a cement joint connecting said fitting and tube for transmitting mechanical stress therebetween, and a packing gland about said tube forming liquid tight connection between said fitting and tube, said packing gland comprising packing material and means for pressing said material against the surface of said tube without transmitting stress to said cement joint.

6. A conduit for an electric conductor comprising a conducting portion and an insulating portion, a mechanical joint connecting said portions, and a packing gland between said portions and forming a liquid tight connection therebetween, said packing gland comprising means for tightening said connection without transmitting stress to said mechanical joint.

7. The combination with a conductor having an insulating covering and a conduit surrounding said conductor and covering and filled with insulating liquid under pressure, of a terminal housing for said conductor comprising a dielectric tube surrounding a portion of said conductor projecting from said conduit, a portion of said tube having a cylindrical outer surface, means for forming a liquid tight joint between said conduit and tube to enable liquid from said conduit to enter said tube without escape, a terminal member having liquid tight connection with the end of said conductor, and a packing gland for connecting said terminal member with said tube to form a liquid tight joint between said terminal member and tube, said packing gland comprising a pair of relatively movable parts separate from said tube and having packing material held thereby in contact with the cylindrical surface of said tube, and threaded means connecting said parts to compress said packing material.

8. The combination with a conductor having an insulating covering and a conduit surrounding said conductor and covering and filled with insulating fluid under pressure, of a terminal housing for said conductor comprising a dielectric tube surrounding a portion of said conductor projecting from the end of said conduit, portions of the outer surface of said dielectric tube being cylindrical, a sleeve bridging the space between said conduit and tube, a packing gland forming a fluid tight joint between said sleeve and tube, said sleeve having fluid tight connection with said conduit, a terminal member secured to the end of said conductor and forming a fluid tight connection therewith, and a packing gland forming a fluid tight connection between said terminal and tube, each of said packing glands comprising a pair of relatively movable parts separate from said tube and having packing material held thereby in contact with the cylindrical surface of said tube, and threaded means connecting said parts to compress said packing material.

9. The combination with a conductor having an insulating covering and a conduit surrounding said conductor and covering and filled with insulating fluid under pressure, of a pothead for said conductor comprising a base plate having an opening therethrough, a dielectric tube mounted on said base plate in registration with said opening for receiving the end of said conductor projecting from said conduit, means for forming a liquid tight connection between said tube and base plate, a sleeve for bridging the space between the end of said conduit and said base plate, and releasable means for forming liquid tight connection between the ends of said sleeve and said conduit and base plate respectively, said sleeve being movable longitudinally of said conduit, when said connection means is released, to permit access to said conductor adjacent the end of said dielectric tube.

10. A pothead comprising a base plate, a stand for supporting said base plate, said base plate having an opening therethrough, a dielectric tube supported on said base plate in registration with said opening, a sleeve for making tight connection between the lower end of said tube and a cable conduit, and packing glands at the upper and lower ends of said sleeve respectively for forming releasable fluid tight connections with said conduit and said tube, said sleeve being movable longitudinally of said tube while in axial alignment therewith, when said packing glands are loosened.

11. A pothead comprising a base plate having an opening therethrough, a dielectric tube mounted on said base plate in registration with said opening, a packing gland forming a liquid tight connection between said dielectric tube and base plate about said opening, a sleeve disposed below said base plate, a packing gland for forming a releasable fluid tight connection between the end of said sleeve and said base plate, and a packing gland for forming a fluid tight connection between the other end of said sleeve and a cable conduit, said sleeve being movable longitudinally of said tube while in axial alignment therewith, when said packing glands are loosened.

12. A pothead for a conductor having an insulating covering, an outer metal sheath and a conduit for insulating fluid under pressure about said covering and sheath, said pothead comprising a base plate having an opening therethrough, a dielectric tube mounted on said base plate in registration with said opening, said tube having space for receiving said conductor and insulating covering and for a supplemental wrapping about said covering adjacent the end of said tube, a conductor for connecting said metal sheath with the outer surface of said dielectric tube, and a displaceable sleeve for connecting said tube with said conduit to form a liquid tight passage therebetween.

13. A pothead for a conductor having an insulating covering, an outer metal sheath and a conduit for insulating fluid under pressure about said conductor, said pothead comprising a base plate having an opening therethrough, an inner tubular member mounted on said base plate in registration with said opening and arranged to surround a portion of said conductor and covering projecting from said conduit, means for forming a liquid tight connection between said base plate and said tube, a terminal member having liquid tight connection with the end of said conductor and mounted on the end of said tube opposite said base plate, means for forming liquid tight connection between said terminal member and said tube, a sleeve for connecting said tube with the end of said conduit, means for forming liquid tight connection between one end of said sleeve and said base plate, and means for forming liquid tight connection between the other end of said sleeve and said conduit, said liquid tight connection means all being releasable and all providing for relative longitudinal movement of the connected parts while said parts are in axial alignment, when said connection means are loosened.

14. A pothead for a conductor having an insulating wrapping, an outer metal sheath and a conduit for fluid under pressure surrounding said conductor, said pothead comprising a base plate, an inner dielectric tube mounted on said base plate, said base plate having an opening therethrough registering with said tube, means for forming liquid tight connection between said tube and base plate, an outer dielectric tube mounted on said base plate and spaced from said inner tube, a closure for the upper end of said outer tube, a spring for exerting pressure on said closure to maintain tight joints between the ends of said outer tube and said closure and base plate respectively, means including a cement joint for transmitting the reaction of said spring to said inner tube and a packed joint not subject to the stress transmitted to said cement joint for forming a liquid tight connection with said reaction transmitting means.

15. The combination with an electrical conductor, of a casing surrounding said conductor and insulated therefrom, a dielectric tube surrounding a portion of said conductor where it enters said casing, a mechanical joint between said casing and tube for transmitting mechanical stress therebetween, a packed joint between said casing and tube forming a liquid tight joint therebetween, a terminal fitting connected to said conductor and insulated from said casing by said dielectric tube, a mechanical and a packed joint between said terminal fitting and said tube, a dielectric housing mounted on said casing and surrounding and spaced from said dielectric tube, and a spring interposed between said terminal fitting and said dielectric housing for resiliently pressing said housing toward said casing, the opposite thrust of said spring being transmitted through said dielectric tube and the aforesaid mechanical joints to said casing, said packed joints being free from the stress transmitted by said mechanical joints, and means for tightening said packed joints, said mechanical joints being free from the stress produced by said tightening means.

16. The combination with a conductor and a conduit for containing liquid under pressure surrounding said conductor, of a pothead for said conductor comprising inner and outer dielectric tubes, a base for said pothead having a collar provided with a downwardly extending rim, said collar having liquid tight connection with said inner tube, a displaceable sleeve, opposite ends of said sleeve overlapping said rim and said conduit respectively for connecting said inner tube and said conduit, and means for forming liquid tight connection between the opposite ends of said sleeve and said rim and conduit respectively, said liquid tight connection forming means being releasable and providing for longitudinal displacement of said sleeve while in axial alignment with said conduit to permit access to said conductor adjacent the end of said inner dielectric tube.

THOMAS F. BRANDT.